(12) United States Patent
Oh et al.

(10) Patent No.: US 7,258,036 B2
(45) Date of Patent: Aug. 21, 2007

(54) BI-DIRECTIONAL ELECTRIC MOTOR WITH ENDPLAY STRUCTURE

(75) Inventors: JonYeon Oh, Suwanee, GA (US); Barry Anderson, Suwanee, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 352 days.

(21) Appl. No.: 10/774,837

(22) Filed: Feb. 9, 2004

(65) Prior Publication Data

US 2005/0081667 A1    Apr. 21, 2005

Related U.S. Application Data

(60) Provisional application No. 60/512,721, filed on Oct. 20, 2003.

(51) Int. Cl.
*F16H 55/18* (2006.01)

(52) U.S. Cl. ............... 74/409; 74/427; 74/440; 74/606 R

(58) Field of Classification Search .......... 74/425, 74/409, 440, 427, 406, 606 R; 310/83, 90
See application file for complete search history.

(56) References Cited

U.S. PATENT DOCUMENTS

| | | | | |
|---|---|---|---|---|
| 4,225,199 A | * | 9/1980 | Earsley ............... 384/470 |
| 4,993,277 A | * | 2/1991 | Adam et al. ............... 74/425 |
| 5,794,480 A | * | 8/1998 | Schonsteiner ............... 74/425 |
| 5,886,437 A | * | 3/1999 | Bohn et al. ............... 310/90 |
| 5,924,326 A | * | 7/1999 | Fiedler et al. ............... 74/400 |
| 5,971,617 A | * | 10/1999 | Woelki et al. ............... 384/295 |
| 6,269,709 B1 | * | 8/2001 | Sangret ............... 74/398 |
| 6,393,929 B1 | * | 5/2002 | Quere et al. ............... 74/411 |
| 6,481,306 B2 | * | 11/2002 | Adachi et al. ............... 74/425 |
| 6,486,577 B1 | * | 11/2002 | Ursel et al. ............... 310/51 |
| 6,789,443 B1 | * | 9/2004 | Torii et al. ............... 74/425 |
| 6,965,180 B2 | * | 11/2005 | Oh et al. ............... 310/90 |

FOREIGN PATENT DOCUMENTS

DE    4427312 A1    8/1994
DE    19513970 A1 *  10/1996

* cited by examiner

*Primary Examiner*—Richard Ridley
*Assistant Examiner*—Terence Boes

(57) ABSTRACT

An endplay structure is provided for controlling endplay of a shaft 25 of a motor 19. The endplay structure includes a body 22 including a generally elliptically shaped recess 26 therein. The recess is constructed and arranged to be disposed generally adjacent to an end of the shaft. An engagement member 28 has a generally spherical portion constructed and arranged to be received in a press-fit arrangement with the recess. The engagement member has a surface 32 constructed and arranged to contact the end of the shaft. Whereby, when the surface of the engagement member is contacted by the end of the shaft, the spherical portion of the engagement member is press-fitted into the recess to control endplay of the shaft.

17 Claims, 3 Drawing Sheets

BI-DIRECTIONAL ELECTRIC MOTOR WITH ENDPLAY STRUCTURE

This application is based on U.S. Provisional Application No. 60/512,721, filed on Oct. 20, 2003, and claims the benefit thereof for priority purposes.

FIELD OF THE INVENTION

This invention relates to controlling endplay of a shaft of a bi-directional motor and, more particularly, to a single endplay structure that can take-up a gap between the endplay structure and an end of a shaft of the motor.

BACKGROUND OF THE INVENTION

With reference to FIGS. 1-3, in conventional motors, one of a number of endplates is selected to take-up a gap between an end of a shaft 12 and the endplay pocket on gearhousing 14. As shown in FIG. 1, endplay plates 10 vary in thickness by 0.1 mm. FIG. 2 shows a 2 mm endplay plate 10 being used in a gear housing 14, while FIG. 3 show a 2.8 mm endplay plate 10 being used to take-up a gap between an end of a shaft 12 and the pocket on the gearhousing 14. Visual inspection is done to optimize the gap and the correct thickness endplay plate 10 is picked up via automation to meet the constant endplay plate gap of between 0.02-0.20 mm. Disadvantages of this configuration include the requirement of providing numerous parts (endplay plates) with different thickness. In addition, a constant process check is needed to select the optimum endplay plate 10 based on the gap between the end of the shaft 12 and endplay plate 10.

Due to using such endplay plates 10, conventional motors require an odd-shaped coverplate that requires numerous iterations to complete an interference fit between the coverplate and gear housing.

There is a need to provide a single endplay structure that can take-up a gap between the endplay structure and an end of a shaft of the motor.

SUMMARY OF THE INVENTION

An object of the present invention is to fulfill the need referred to above. In accordance with the principles of the present invention, this objective is obtained by providing an endplay structure for controlling endplay of a shaft of a motor. The endplay structure includes a body having a generally elliptically shaped recess therein. The recess is constructed and arranged to be disposed generally adjacent to an end of the shaft. An engagement member has a generally spherical portion constructed and arranged to be received in a press-fit arrangement with the recess. The engagement member has a surface constructed and arranged to contact the end of the shaft. Whereby, when the surface of the engagement member is contacted by the end of the shaft, the spherical portion of the engagement member is press-fitted into the recess to control endplay of the shaft.

In accordance with another aspect of the invention, an electric motor includes a gearhousing having a gear and a shaft having a worm constructed and arranged to engage the gear. The gearhousing has a body including a generally elliptically shaped recess therein. The recess is disposed generally adjacent to an end of the shaft. An engagement member has a generally spherical portion constructed and arranged to be received in a press-fit arrangement with the recess. The engagement member has a surface constructed and arranged to contact the end of the shaft. Whereby, when the surface of the engagement member is contacted by the end of the shaft, the spherical portion of the engagement member is press-fitted into the recess to control endplay of the shaft.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
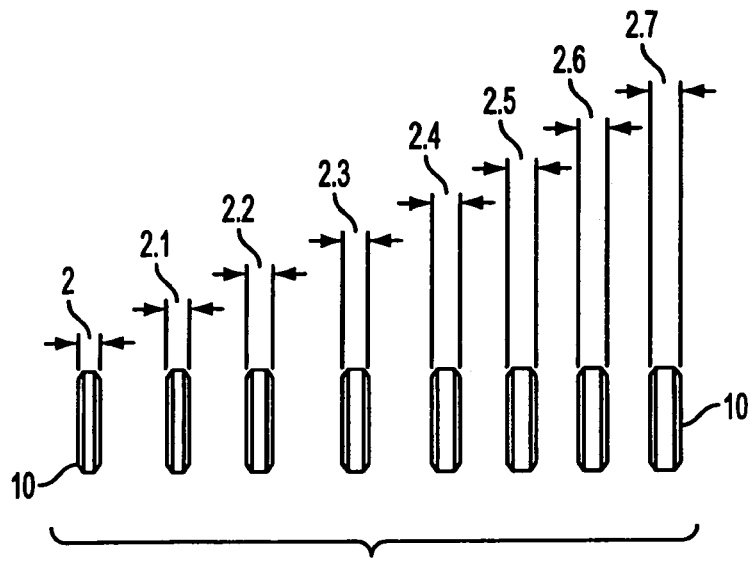
FIG. 1 shows a series of conventional endplay plates that vary in thickness.
Figure 2:
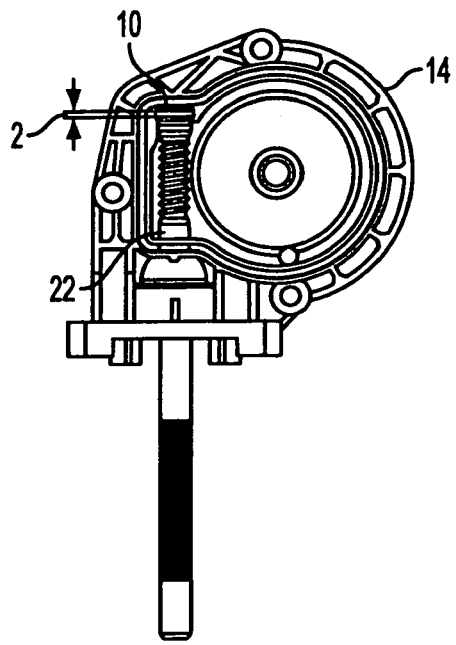
FIG. 2 is a view of a gear housing of a motor including a conventional 2 mm thick endplay plate adjacent to a shaft.
Figure 3:
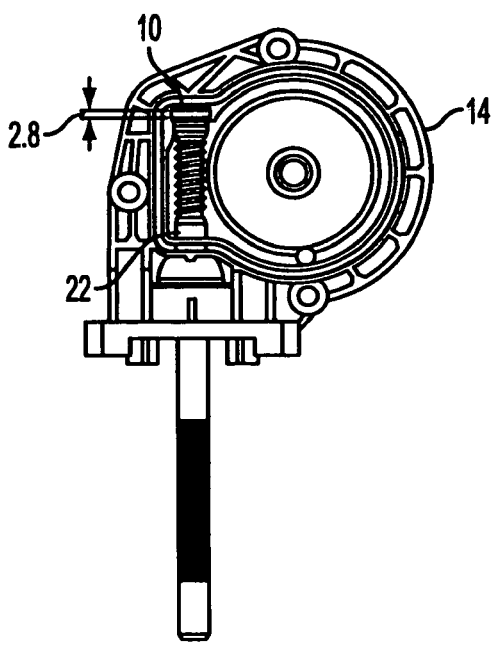
FIG. 3 is a view of a gear housing of a motor including a conventional 2.8 mm thick endplay plate adjacent to a shaft.
Figure 4:
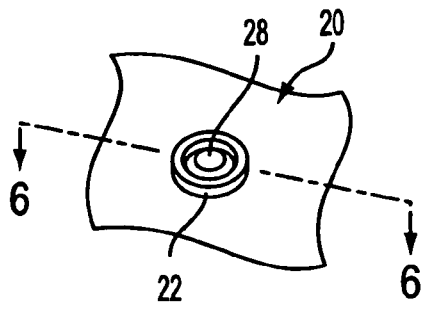
FIG. 4 is a top perspective view of an endplay structure provided in accordance with the invention.

With reference to FIG. 4, an endplay structure, generally indicated at 20, is shown in accordance with the invention. The endplay structure 20 includes a body 22 and an engagement member 28. The body 22 is preferably a portion of a gearhousing 34 (FIG. 9) of a motor 19. The gearhousing 34 can be considered to be part of the motor housing. The body 22 includes a generally elliptically shaped recess 26 therein disposed generally adjacent to an end of a shaft 25 of the motor. The shaft 25 includes a worm 21 constructed and arranged to engage a gear 23 (FIG. 8) disposed in the gearhousing 34.

The engagement member 28 is constructed and arranged to be received in a press-fit arrangement with the recess 26. In the embodiment, the engagement member 28 has a spherical portion 30 and a contact surface 32, constructed and arranged to contact an end of the shaft 25. The contact surface 32 is defined by a concave radius surface such as, for example, a 30-millimeter radius that mates with an end 27 of the shaft 25 having a matching convex radius surface. The engagement member 28 can be a completely spherical (e.g., a round ball) since the contact between the engagement member and the convex radius of the end of the shaft 12 is point-to point contact to reduce friction.

Figure 8:
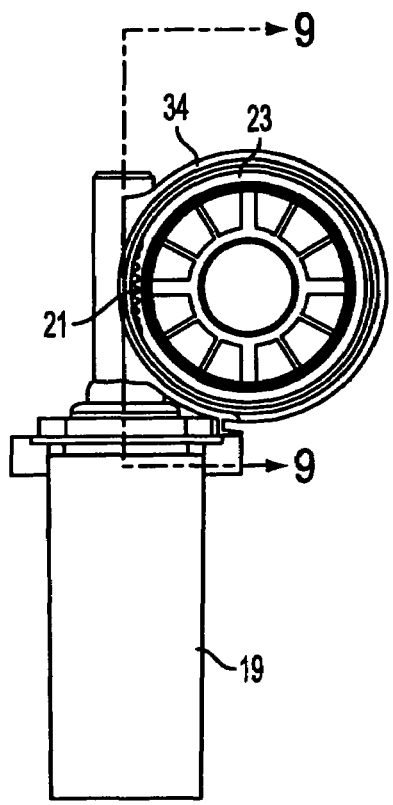
FIG. 8 is a side view of a gear housing of a motor employing an endplay structure of the invention.
Figure 9:
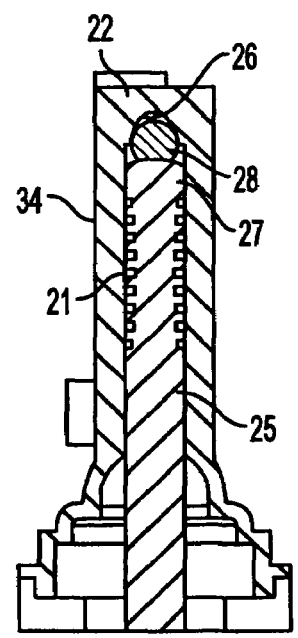
FIG. 9 is a sectional view taken along the line 9-9 of FIG. 8.

As shown in FIGS. 8 and 9, the body 22 is preferably a portion of the gearhousing 34 of a motor. However, the body 22 can be a separate part that is mounted to the gearhousing generally adjacent to the shaft 25.

Figure 5:
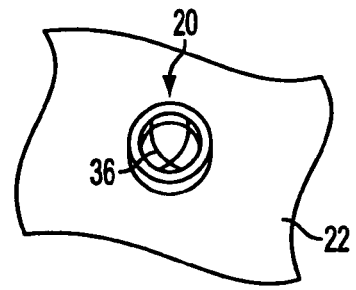
FIG. 5 is top perspective view of the body of the endplay structure of FIG. 4.

In the embodiment and as shown best in FIG. 5, upstanding ribs 36 forming an X shape extend from the bottom of the recess 26 defining a stop, the function of which will be explained below.

The engagement member 28 is contacted due to the thrust force of the armature shaft 25 to insert the spherical portion 30 into the recess 26 to control endplay of the shaft 25. When this occurs, the spherical portion 30 of the engagement member 28 deforms the ribs 36 which define a dead stop for movement of the spherical portion 30 in the vertical direction. The combination of the elliptical-shaped recess 26 and the spherical portion 30 provides an optimum configuration for an interference fit.

Figure 6:
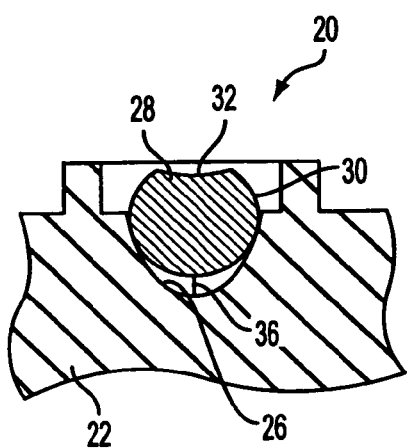
FIG. 6 is an enlarged sectional view taken along the line 6-6 in FIG. 4 shown before insertion of an engagement member of the endplay structure.
Figure 7:
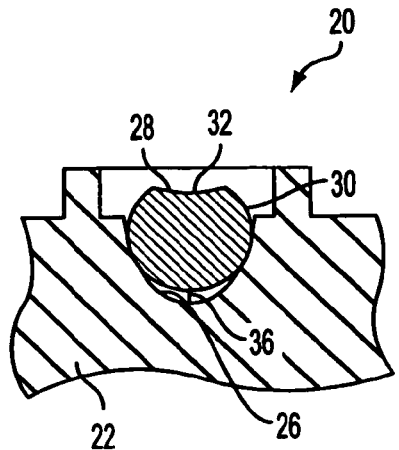
FIG. 7 is a view of FIG. 6 shown after insertion of an engagement member of the endplay structure.

FIG. 6 shows the engagement member 28 located with respect to the recess 26 before complete insertion therein. The interference fit of the engagement member 28 with recess 26 can take-up a gap up to about 0.8 mm in the vertical direction. FIG. 7 shows the same engagement member after insertion into the recess 26.

With the endplay structure 20, one assembly is used instead of picking one of a plurality of conventional endplay plates. The endplay structure 20 thus reduces assembly time and tooling costs.

The endplay structure 20 can be used in any bi-directional motor.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An endplay structure for controlling endplay of a shaft of a motor, the endplay structure comprising:
   a body including a generally elliptically-shaped recess therein, the recess being constructed and arranged to be disposed generally adjacent to an end of the shaft, and
   an engagement member having a generally spherical portion constructed and arranged to be received in a press-fit arrangement with the recess, the engagement member having a surface constructed and arranged to contact the end of the shaft,
   whereby, when the surface of the engagement member is contacted by the end of the shaft, the spherical portion of the engagement member is press-fitted into the recess to control endplay of the shaft,
   wherein upstanding ribs extend from a bottom of the recess and within the recess, the ribs being constructed and arranged such that as the spherical portion of the engagement member is press-fitted into the recess, the spherical portion directly contacts and deforms the ribs enabling the spherical portion to move further into the recess with the ribs defining a stop.

2. The structure of claim 1, in combination with a housing of the motor, the body being integral with the housing.

3. The structure of claim 1, wherein the surface of the engagement member is defined by a concave radius surface.

4. The structure of claim 1, wherein the ribs form a generally X-shape.

5. The structure of claim 1, in combination with a gearhousing and a shaft of a motor, wherein the body is integral with the gearhousing.

6. The combination of claim 5, wherein the surface of the engagement member is defined by a concave radius surface that mates with a matching convex radius surface defined at the end of the shaft.

7. A electric motor comprising:
   a gearhousing having a gear,
   a shaft having a worm constructed and arranged to engage the gear,
   the gearhousing having a body including a generally elliptically-shaped recess therein, the recess being disposed generally adjacent to an end of the shaft, and
   an engagement member having a generally spherical portion constructed and arranged to be received in a press-fit arrangement with the recess, the engagement member having a surface constructed and arranged to contact the end of the shaft,
   whereby, when the surface of the engagement member is contacted by the end of the shaft, the spherical portion of the engagement member is press-fitted into the recess to control endplay of the shaft,
   wherein upstanding ribs extend from a bottom of the recess and within the recess, the ribs being constructed and arranged such that as the spherical portion of the engagement member is press-fitted into the recess, the spherical portion directly contacts and deforms the ribs enabling the spherical portion to move further into the recess with the ribs defining a stop.

8. The electric motor of claim 7, wherein the surface of the engagement member is defined by a concave radius surface.

9. The combination of claim 8, wherein the surface of the engagement member is defined by a concave radius surface that mates with a matching convex radius surface defined at the end of the shaft.

10. The structure of claim 7, wherein the ribs form a generally X-shape.

11. An endplay structure for controlling endplay of a shaft of a motor, the endplay structure comprising:
    a body including a means for receiving, the means for receiving being constructed and arranged to be disposed generally adjacent to an end of the shaft, and
    means for engaging having a portion constructed and arranged to be received in a press-fit arrangement with the means for receiving, the means for engaging having a surface constructed and arranged to contact the end of the shaft,
    whereby, when the surface of the means for engaging is contacted by the end of the shaft, the portion of the means for engaging is press-fitted into the means for receiving to control endplay of the shaft,
    wherein the means for receiving is a recess having upstanding ribs extending from a bottom thereof and within the recess, the ribs being constructed and arranged such that as the portion of the means for engaging is press-fitted into the recess, the portion directly contacts and deforms the ribs enabling the portion to move further into the recess with the ribs defining a stop.

12. The structure of claim 11, in combination with a housing of the motor, the body being integral with the housing.

13. The structure of claim 11, wherein the surface of the means for engaging is defined by a concave radius surface.

14. The structure of claim 11, wherein the ribs form a generally X-shape.

15. The structure of claim 11, wherein the portion of the means for engaging is generally spherical and the means for receiving is a generally elliptically-shaped recess.

16. The structure of claim 11, in combination with a gearhousing and a shaft of a motor, wherein the body is integral with the gearhousing.

17. The combination of claim 16, wherein the surface of the means for engaging is defined by a concave radius surface that mates with a matching convex radius surface defined at the end of the shaft.

* * * * *